(12) United States Patent
de Lannoy et al.

(10) Patent No.: US 10,710,283 B2
(45) Date of Patent: Jul. 14, 2020

(54) MEMBRANE SURFACE HYDROPHOBICITY THROUGH ELECTRO-HYDRODYNAMIC FILM PATTERNING

(71) Applicant: Palo Alto Research Center Incorporated, Palo Alto, CA (US)

(72) Inventors: Charles-Francois de Lannoy, Hamilton (CA); Corie Lynn Cobb, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 485 days.

(21) Appl. No.: 15/388,851

(22) Filed: Dec. 22, 2016

(65) Prior Publication Data

US 2018/0178167 A1 Jun. 28, 2018

(51) Int. Cl.
*B01D 67/00* (2006.01)
*B01D 69/02* (2006.01)
(Continued)

(52) U.S. Cl.
CPC .......... *B29C 41/38* (2013.01); *B01D 67/0034* (2013.01); *B01D 69/02* (2013.01);
(Continued)

(58) Field of Classification Search
CPC ......... B29C 41/38; B29C 59/10; B29C 41/28; B01D 67/0034; B01D 69/02;
(Continued)

(56) References Cited

U.S. PATENT DOCUMENTS

| 4,026,978 A | 5/1977 | Mungle et al. |
| 5,439,631 A | 8/1995 | Schneider et al. |

(Continued)

FOREIGN PATENT DOCUMENTS

| WO | 2014039894 | 3/2014 |
| WO | 2015048442 | 4/2015 |

OTHER PUBLICATIONS

Khulbe, K.C, et al., "The Art of Surface Modification of Synthetic Polymeric Membrane," Journal of Applied Polymer Science, 115 (2010), 855-895.

(Continued)

*Primary Examiner* — Robert J Grun
(74) *Attorney, Agent, or Firm* — Miller Nash Graham & Dunn LLP

(57) ABSTRACT

A roll-to-roll system for forming a hydrophobic polymer membrane surface includes a heated carrier belt, a repository of polymer material arranged to deposit the polymer material onto the carrier to create a heated polymer, an electrode belt positioned opposite the carrier belt, an electric field generator positioned to generate an electric field between the carrier belt and the electrode belt and to infuse a pattern into the heated polymer to form a patterned polymer film, and a solvent bath to rinse the patterned polymer film. A method of creating a hydrophobic polymer membrane surface includes depositing a polymer material onto a heated carrier, using the carrier, transporting the polymer material past an electrode that acts as an electric field generator, generating an electric field adjacent the carrier, using the electric field to infuse a pattern into the polymer membrane surface, and setting the pattern into the polymer membrane surface.

8 Claims, 5 Drawing Sheets

(51) Int. Cl.
    *B29C 41/28*     (2006.01)
    *B29C 41/38*     (2006.01)
    *B29C 59/10*     (2006.01)
    *B29C 33/36*     (2006.01)
    B29L 31/00     (2006.01)
    *B01D 61/36*     (2006.01)
    *B01D 61/02*     (2006.01)

(52) U.S. Cl.
CPC .............. *B29C 41/28* (2013.01); *B29C 59/10* (2013.01); *B01D 61/02* (2013.01); *B01D 61/362* (2013.01); *B01D 61/364* (2013.01); *B01D 67/0009* (2013.01); *B01D 2323/35* (2013.01); *B01D 2323/42* (2013.01); *B01D 2325/08* (2013.01); *B01D 2325/38* (2013.01); *B29K 2995/0093* (2013.01); *B29L 2031/755* (2013.01)

(58) Field of Classification Search
CPC .............. B01D 2325/08; B01D 61/364; B01D 61/362; B01D 61/02; B01D 2323/42; B01D 2323/35; B01D 2325/38; B01D 67/0009; B29K 2995/0093; B29L 2031/755

See application file for complete search history.

(56) References Cited

U.S. PATENT DOCUMENTS

| | | |
|---|---|---|
| 8,486,280 B2 | 7/2013 | Lee et al. |
| 9,348,231 B2 | 5/2016 | Johnson et al. |
| 2014/0248429 A1 | 9/2014 | Yang et al. |
| 2015/0022790 A1 | 1/2015 | Johnson et al. |

OTHER PUBLICATIONS

Ulbricht, "Advanced Functional Polymer Membranes," Polymer 47 (2006), 2217-2262.

Nakajima, "Design of hydrophobic surfaces for liquid droplet control," Nature—Asia Materials (2011), 3, 49-56.

MEMBRANE SURFACE HYDROPHOBICITY THROUGH ELECTRO-HYDRODYNAMIC FILM PATTERNING

TECHNICAL FIELD

This disclosure relates to electro-hydrodynamics (EHD), more particularly to EHD film patterning.

BACKGROUND

Hydrophobic membranes have several different applications including membrane distillation desalination, pervaporation, dewatering solvents, gas-water vapor separation, solvent-solvent separation, acid purification, base purification, azeotrope separation, natural gas purification, pharmaceutical separation, purification of cells, yeast, proteins, bacteria, viruses, serums, and enzymes, water-gas hydrophobic barriers, sealing, venting, gas processing. Membranes are barriers that enable the separation of solutes from a solution. Membranes can separate solutes based on size, charge, or molecular diffusivity, and each type of separation is based on a different physical mechanism. Most hydrophobic membranes separate solutes based on size, a process termed size exclusion or sieving. These membranes are formed from porous materials. The size of the pores determines the size of the solutes that can be separated, but most hydrophobic membranes contain a distribution of pore sizes centered about a dominant pore size. Pore size is directly proportional to the trans-membrane flux, because larger pores generally lead to higher fluxes.

The operation of a membrane is similar to that of a sieve. The solution is flowed over the surface of the porous membrane under pressure, and solutes that are larger than the membrane pore size are prevented from passing across the barrier, while the solvent or solvents, in addition to any solutes that are smaller than the pore size, pass through the membrane. This process can be performed continuously in series to produce two solutions, one containing solutes smaller than the pore size, and one containing solutes of all sizes.

Typical hydrophobic membrane materials are polymers or ceramics. Polymeric and thin film composite membranes are often made from polysulfone, polyethersulfone, polyvinylalcohol, polyamide, polyacrilonitrile, polyimide, polyethylene, polypropylene, polytetrafluoroethylene, polyvinylidene fluoride, polyvinylchloride, cellulose acetate, cellulose triacetate. Ceramic membranes are typically made from zirconia oxides, titanium oxides, aluminum oxides, and silicon carbides. Various combinations of the above materials are also formed for specific separations.

Polymeric membranes are formed by dissolving the polymers in a solvent to high viscosity, then drawing, extruding, or spinning the viscous polymer solutions into their final conformation (flat sheets, thin films, hollow fibers, capillaries, tubes, fibers, or any combination of these), and then by gelling or precipitating the polymer. This final step is achieved by removing the solvent, either by evaporating the solvent through heat or by immersing the polymer-solvent solution into a non-solvent bath. Precipitating the polymer-solvent through non-solvent immersion is termed immersion precipitation, non-solvent gelation, or membrane phase inversion. The non-solvent bath is often pure water or a solution of water and a low concentration of a solvent (usually the solvent used in dissolving the membrane).

Hydrophobic membranes, a subset of membranes, have unique surface properties with little or no tendency to adsorb water. Water tends to bead on their surfaces, such as in discrete droplets, and thereby hydrophobic surfaces resist wetting. The physics of surface hydrophobicity is not precisely understood, but certain surface characteristics are known to produce hydrophobicity. Hydrophobic materials possess low surface tension values and lack active groups in their surface chemistry for formation of hydrogen bonds with water, such as carboxyl or hydroxyl groups. Greater charge density on a membrane is associated with greater membrane hydrophilicity, or an affinity for water. Most commodity polymers (excluding polytetrafluoroethylene) have surface free energies that give them only moderate hydrophobic properties. Most commodity polymers typically carry some degree of negative surface charge, and therefore have some degree of hydrophilicity. Hydrophilicity is beneficial in some circumstances, but for applications mentioned above, hydrophobicity is desired. State of the art membranes rely on chemical coatings, such as chemical modification of base layers, chemically grafted moieties, and other coatings, or inherently hydrophobic polymers such as PTFE (polytetrafluorethylene). Methods to make membrane surfaces more hydrophobic are limited in applicability and robustness. Furthermore, methods to make hydrophobic membranes from the majority of commodity polymers, which are inherently hydrophilic, are lacking.

Surface roughness has been shown to contribute to surface hydrophobicity. Uniformly structured surface roughness greatly increases the surface hydrophobicity. Uniform surface structures can be achieved through surface patterning. This has been shown to greatly increase surface hydrophobicity, but methods to do so efficiently and effectively do not currently exist. Efficient, large-scale, surface structure patterning could enable the use of common hydrophilic commodity polymers to produce hydrophobic membranes.

SUMMARY

An embodiment consists of a roll-to-roll system for forming a hydrophobic polymer membrane surface including a heated carrier belt, a repository of polymer material arranged to deposit the polymer material onto the carrier to create a heated polymer, an electrode belt positioned opposite the carrier belt, an electric field generator positioned to generate an electric field between the carrier belt and the electrode belt and to infuse a pattern into the heated polymer to form a patterned polymer film, and a solvent bath to rinse the patterned polymer film.

Another embodiment is a method of creating a hydrophobic polymer membrane surface includes depositing a polymer material onto a heated carrier, using the carrier, transporting the polymer material past an electrode field generator, generating an electrode field adjacent the carrier, using the electric field to infuse a pattern into the polymer membrane surface, and setting the pattern into the polymer membrane surface.

DETAILED DESCRIPTION OF THE EMBODIMENTS

Specifically, the embodiments here propose a technology to form hydrophobic membranes from hydrophilic polymers with charged surfaces in an efficient roll-to-roll process. The polymers that are of interest are termed polyelectrolytes and they include: carboxymethyl cellulose, polystyrene sulfonates, polyacrylic acid, polyaniline, polyallylamine hydrochloride, poly(2-acrylamido-2-methyl-1-propanesulfonic acid), polyaspartic acid, alginates, pectin, carrageen. Hydrophobic membranes can be formed from these polymers directly or from typical membrane polymers containing amounts of these polyelectrolytes as additives.

Figure 1:
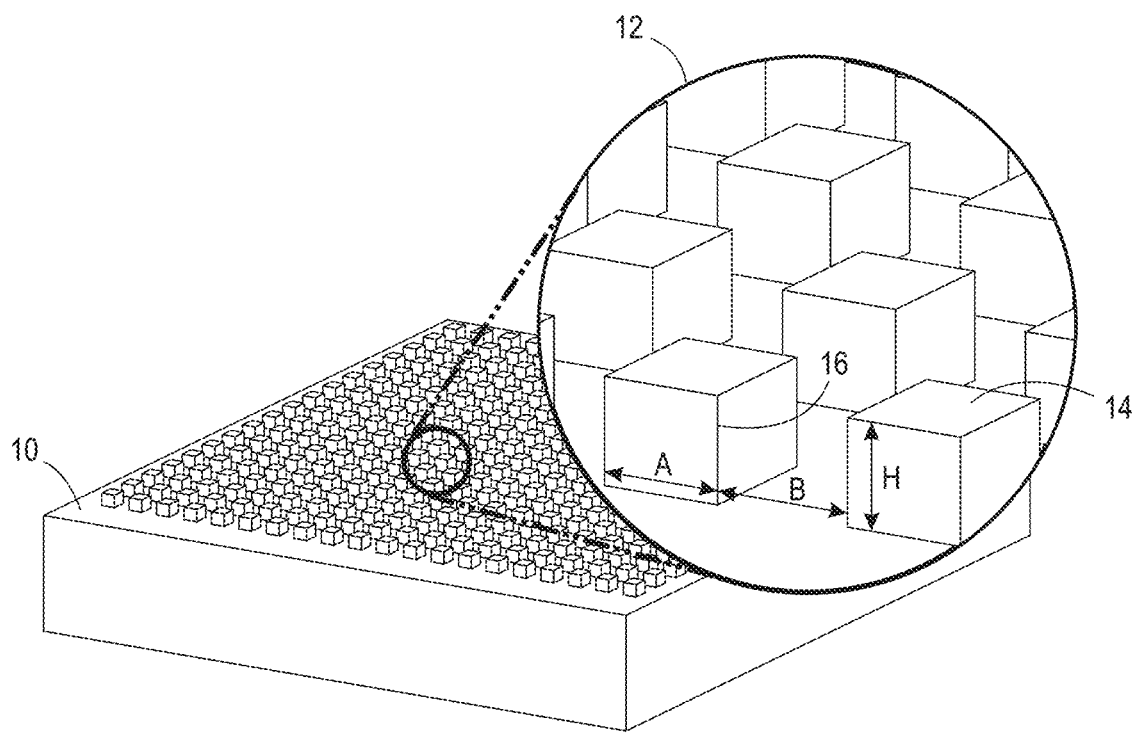
FIGS. 1-4 shows examples of patterned polymer films.

FIG. 1 shows an example of a patterned polymer film 10. Hydrophobic films have a high contact angle, meaning that drops of solution do not wet the surface. Increasing the surface roughness of the film by patterning, increases the contact angle and therefore the hydrophobicity. The equation used to calculate the theoretical marginal values of the dimension H, b and a, where H is the height of the pillars and/or posts in the pattern, referred to here collectively as posts, b is the gap between the posts, and a is the width of the posts. In the expanded view 12, b is the gap between the posts 14 and 16, and a is the width of post 16. The equation is:

$$\frac{b}{a} = \sqrt{-\frac{4\cos\theta_i}{(\cos\theta_i)\left(\frac{\alpha}{H}\right)} - 1}.$$

Figure 2:
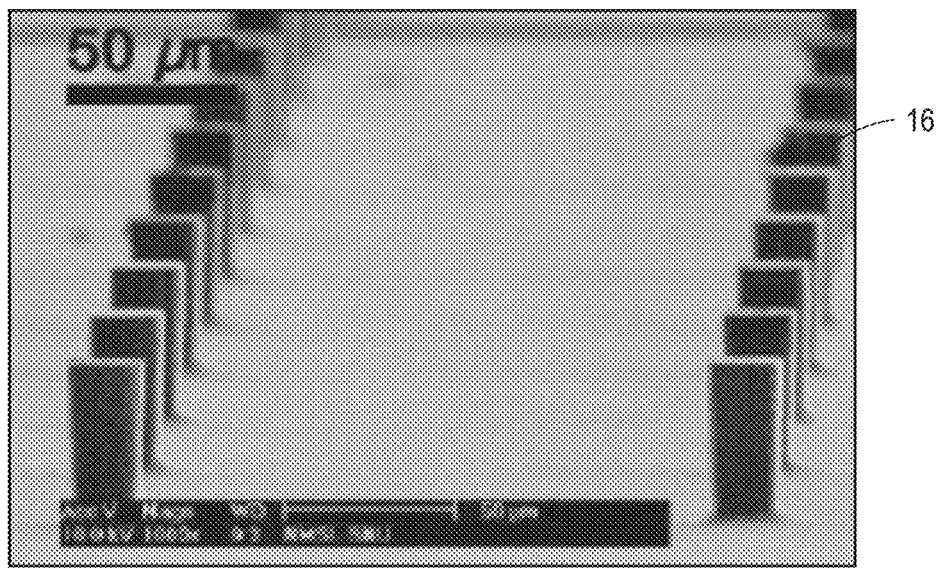
Figure 3:
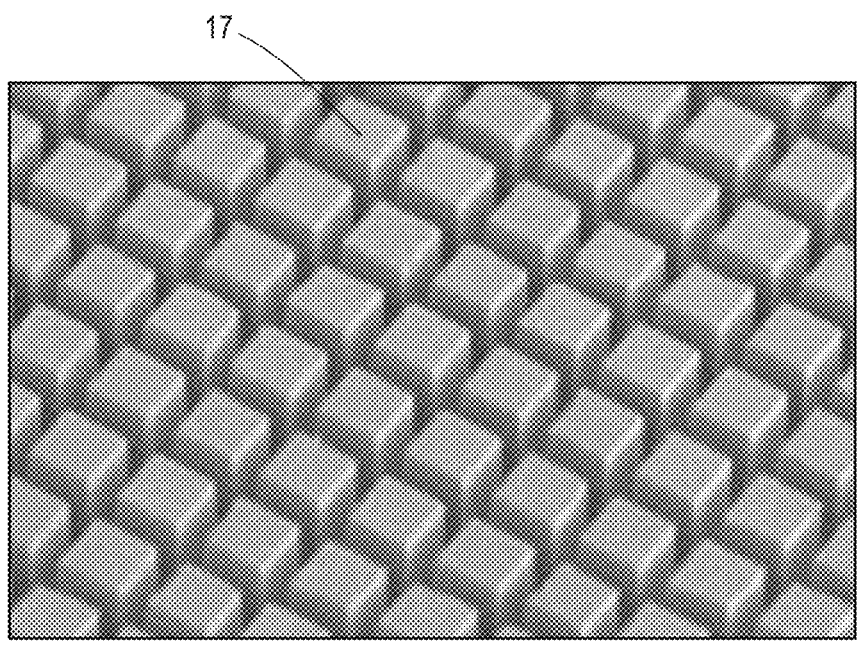
Figure 4:
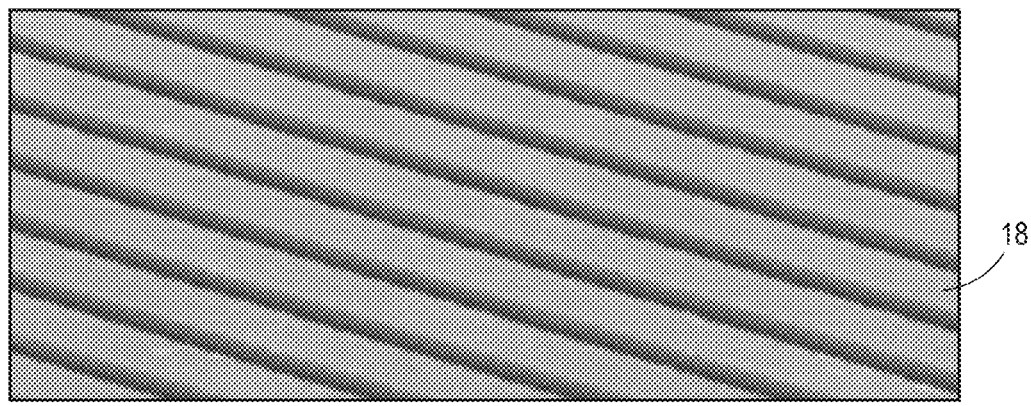

The pattern infused into the polymer film may have nanopatterned roughness, meaning that the roughness patterned into the film is on a nanometer scale, superimposed over a micropatterned roughness. However, even if the patterned roughness is only on the micropatterned scale, the hydrophobicity increases. FIG. 2 shows an embodiment of a post 16. FIG. 3 shows an embodiment of an array of posts such as 17, and FIG. 4 shows a pattern of stripes such as 18.

Current patterning methods include focused ion beam milling for silicon wafers, laser etching metals, $XeF_2$ gas phase etching and wafer dicing for silicon wafers. Another method of generating patterns is to use electrohydrodynamic (EHD) film patterning (EHD-FP). In one use of EHD-FP, in U.S. Pat. No. 9,348,231, an electric field is used to align liquid forms inside the polymer films such as nanotubes and nanowires and then cure the film.

Figure 5:
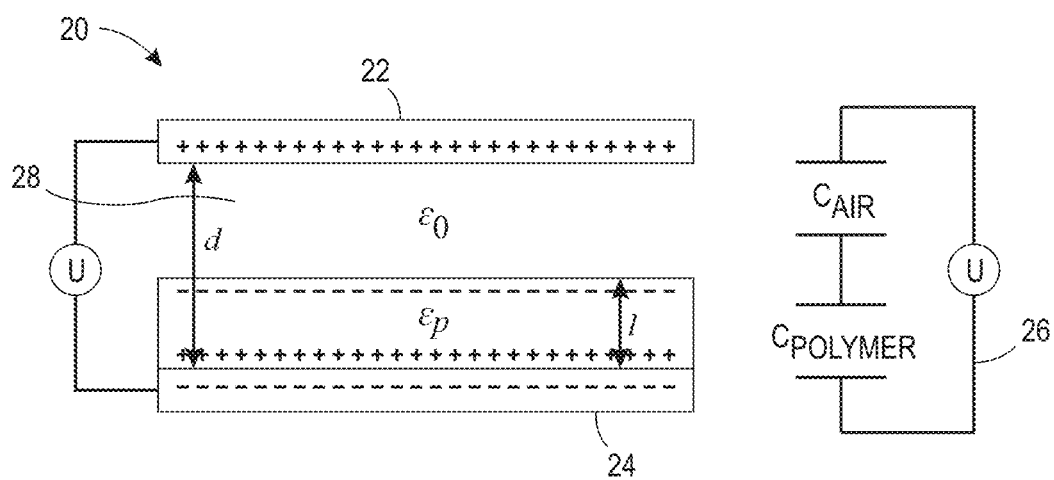
FIG. 5 shows an electric field generator for electrohydrodynamic film patterning.

The alignment results from the application of an electric field from an electric field generator 20, such as that shown in FIG. 5. In FIG. 5, a current source such as 26 generates a field that is applied to a set of electrodes, a positive electrode 22 and a negative electrode 24. When the current is applied, an electric field is generated in the region 28 between the two electrodes.

As used here, rather than to cause liquid forms in the polymer material as in the patent mentioned above, the field is used to form the pattern in the film itself, creating pattern roughness. Control of the field controls the resulting pattern, in one embodiment. In another embodiment, the carrier belt, discussed in more detail in FIG. 3, has a pattern that is infused into the polymer upon the application of the field.

Figure 6:
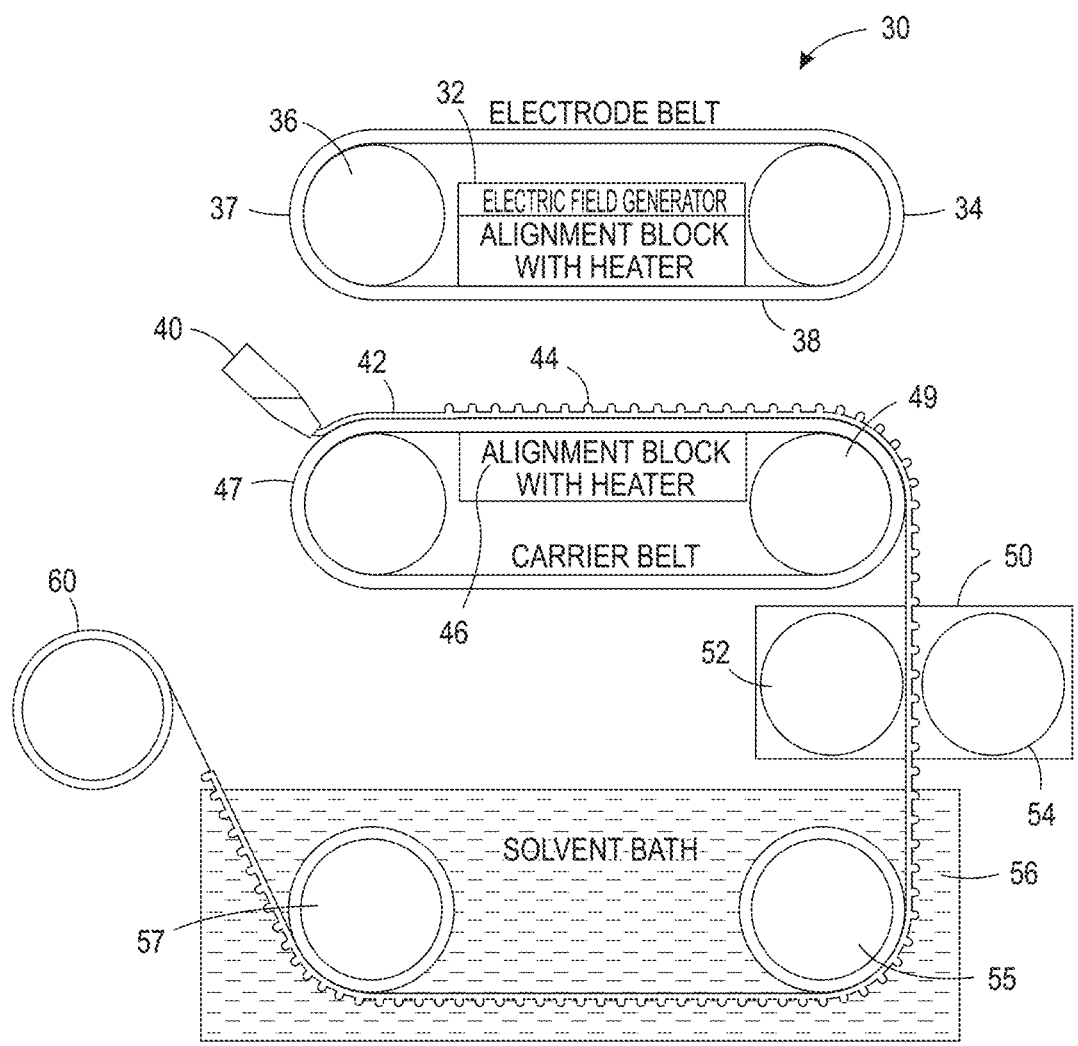
FIG. 6 shows an embodiment of an electrohydrodynamic film patterning system.
Figure 7:
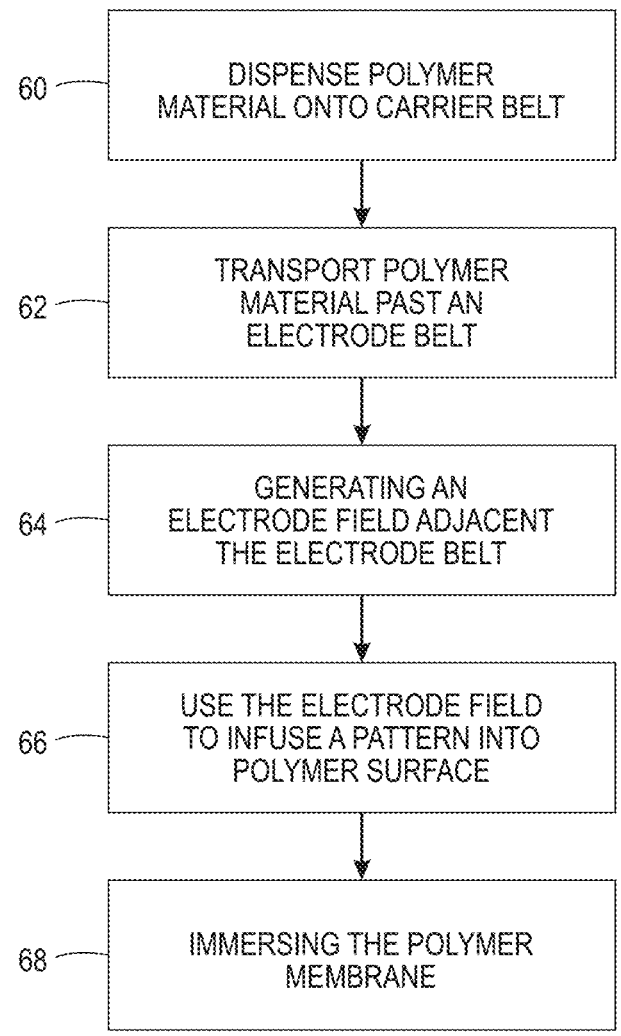
FIG. 7 shows a flowchart of an embodiment of a method to electrohydrodynamically pattern a polymer film.

The embodiments here use roll-to-roll processing, which makes them faster, cheaper, and scalable compared to sheet at a time processing or microfabrication. FIG. 6 shows an embodiment of a system 30 to perform EHD-FP, and FIG. 7 shows an embodiment of a method to use the system. A repository 40 deposits a polymer material 42 onto a carrier belt 47 at 60. The polymer material 42 may consist of a polymer mixed with a solvent to allow the material to be easily dispensed. The polymer material may consist of a slurry or a liquid. For processing that is not roll-to-roll, the carrier may consist of something besides a belt, such as a chip carrier or other transport means. The term 'carrier' as used here includes any carrier that can receive the polymer material and transport it.

The carrier 47 is heated by a heater 46. The carrier transports the polymer material at 62 through an electric field generated by the electric field generator 32 at 64 that is arranged adjacent the electrode belt 37. For non-roll-to-roll processing, the electrode field generator may not require the electrode belt. The field generator 32 generates an electric field through which the polymer material travels and forms a pattern 44 at 66.

As mentioned previously, the pattern may be formed on a microscale or a nanoscale with a repeating pattern. The repeating pattern may have pillars and/or posts may have a circular, rectangular or square cross-section. It has been shown that repeated patterns of roughness increase the hydrophobicity.

Once formed in the polymer, the pattern can be set in many different ways. In one embodiment, the now-patterned polymer film may be heated to a higher temperature than originally heated. This may be accomplished by the heater 46, or by the second roller 49. The second temperature is high enough to evaporate any of the solvent in the polymer material. The pattern may be set with the use of a chilling roller 48 or other cooling mechanisms.

Alternative to evaporating the solvent in the polymer material, the patterned polymer film may be rinsed by submersion in a solvent bath 50, along transport rollers 52 and 54. The patterned film may undergo a second solvent bath 56 along rollers 55 and 57 to gelatinize or otherwise set the pattern. In this manner, a roll-to-roll process can implement EHD to pattern films to create a periodic roughness pattern that increases the hydrophobicity of the film.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A roll-to-roll system for forming a hydrophobic polymer membrane surface, comprising:
   a heated carrier belt;
   a repository of polymer material arranged to deposit the polymer material onto the carrier to create a heated polymer, wherein the polymer material contains polyelectrolytes;
   an electrode belt positioned opposite the carrier belt;
   an electric field generator positioned to generate an electric field between the carrier belt and the electrode belt and to infuse a pattern into the heated polymer to form a patterned polymer film;
   a first solvent bath to rinse the patterned polymer film; and
   a second solvent bath to set the pattern in the patterned polymer film.

2. The system of claim 1, wherein the electrode belt is heated.

3. The system of claim 1, wherein the polymer material comprises one of a liquid or a slurry.

4. The system of claim 1, wherein the pattern is one of micro-scale or nano-scale.

5. The system of claim 1, wherein the electrode belt has a pattern on its surface.

6. The system of claim 1, wherein the pattern comprises a periodic pattern of one of pillars or posts.

7. The system of claim 6, wherein the pillars or posts have one of a rectangular, circular, or square cross-section.

8. The system of claim 1, wherein the second solvent bath to set the pattern in the film is selected to gelatinize the polymer to set the pattern.

* * * * *